United States Patent [19]

Sugitani et al.

[11] Patent Number: 5,034,232

[45] Date of Patent: Jul. 23, 1991

[54] FLAVORED IMITATION MEAT PROTEIN MATERIAL AND FRIED PRODUCT THEREOF

[75] Inventors: Isamu Sugitani, Takaishi; Yoichi Kawasaki; Tatsuo Ueda, both of Sennan; Nobuhiro Ohtsubo, Kaizuka; Yoshiaki Ueki, Izumiohtsu, all of Japan

[73] Assignee: Fuji Oil Company, Limited, Osaka, Japan

[21] Appl. No.: 418,329

[22] Filed: Oct. 6, 1989

Related U.S. Application Data

[63] Continuation-in-part of Ser. No. 147,344, Jan. 22, 1988, abandoned.

[30] Foreign Application Priority Data

Jan. 29, 1987 [JP] Japan ................... 62-20036
Jul. 14, 1987 [JP] Japan ................. 62-176917

[51] Int. Cl.$^5$ ............................. A23L 1/20
[52] U.S. Cl. ......................... 426/46; 426/49; 426/634; 426/656; 426/573; 426/516; 426/438; 426/574; 426/89

[58] Field of Search ............... 426/46, 32, 49, 634, 426/656, 89, 94, 438, 573–574, 516, 523

[56] References Cited

U.S. PATENT DOCUMENTS 3,950,550  4/1976  Katayama et al. ............... 426/656
4,579,749  4/1986  Ishizuka et al. .................. 426/634
4,642,241  2/1987  Noguchi ........................... 426/634

OTHER PUBLICATIONS

Shurtleff et al., "Tofu and Soymilk Production", The Book of Tofu, vol. II, pp. 132–181, Date unknown.

*Primary Examiner*—Marianne Cintins
*Attorney, Agent, or Firm*—Wenderoth, Lind & Ponack

[57] ABSTRACT

A flavored imitation meat protein material having a fibrous structure is produced by cooking an aqueous mixture of a protein raw material, a flavor material and optionally egg white with a twin-screw extruder and extruding through a die with the expansion of the extruded material. A fried product obtained from the flavored imitation meat protein material is also disclosed.

15 Claims, No Drawings

FLAVORED IMITATION MEAT PROTEIN MATERIAL AND FRIED PRODUCT THEREOF

This application is a continuation-in-part application of application Ser. No. 147,344 filed Jan. 22, 1988, now abandoned.

FIELD OF THE INVENTION

The present invention relates to a flavored imitation meat protein material produced by a twin-screw extruder and a fried product thereof. The material and the product of the present invention have good meat-like mouthfeel with good flavor and taste, and maintain such good flavor and taste even after chewing.

BACKGROUND OF THE INVENTION

In the production of imitation meat protein materials, various methods have been known. For example, it has been known that an imitation meat protein material can be produced by spinning, injection, discharge or extrusion of a proteinaceous raw material and, usually, to preserve it, the resulting material is dried. Imitation meat protein materials thus obtained have various structures such as fibrous structures, network structures, rope-like structures, membrane-like structures and the like. Among them, in order to produce an imitation meat protein material by extrusion, a single screw extruder has been predominantly used to cook and extrude a raw material and, usually, the resulting material has a swollen network structure.

However, recently, a twin-screw extruder has been introduced as one of advanced techniques and studied. And, it has been known that, in comparison with a conventional single screw extruder, a twin-screw extruder has various advantages such as constant extrusion, less scorching, broad selectivity of raw materials and the like. Further, it has been known that the material obtained has a good fibrous structures, and texture and mouthfeel thereof very much resemble to meat.

On the other hand, since these conventional known imitation meat protein materials are not flavored, usually, they are secondarily processed by flavoring according to particular purposes and preference. In this respect, although flavoring can be effected freely to meet a particular product, there is such defect that flavor and taste thus provided by the secondary processing are liable to be lost by chewing and to leave only an aftertaste derived from the raw material thereof.

In addition, although a fried product is often produced from a dried imitation meat protein material by reconstituting the material with water or hot water and flavoring the material during reconstitution and then frying the resulting flavored material, the flavor and taste of the flavored material is also liable to be lost by chewing.

Thus, it has not been known heretofore in the prior art that an imitation protein material may be primarily or originally flavored during cooking with a twin-screw extruder to provide good meat-like flavor and taste which are hardly lost by chewing.

OBJECTS OF THE INVENTION

One object of the present invention is to provide a process for producing a flavored imitation meat protein material which is primarily flavored during cooking with a twin-screw extruder to provide good meat-like flavor and taste which are hardly lost by chewing.

Another object of the present invention is to provide a fried product produced from the flavored imitation meat protein material thus obtained.

These objects as well as other objects and advantages of the present invention will become apparent to those skilled in the art from the following description.

SUMMARY OF THE INVENTION

According to the present invention, there is provided a process for producing a flavored imitation meat protein material having a fibrous structure which comprises treating an aqueous mixture of a protein raw material and a flavor material with a twin-screw extruder under high temperature and high pressure, extruding through a die with the expansion of the extruded material, and optionally drying the extruded material. With a view towards maintaining good flavor and taste after chewing, it is more preferable to use egg white together with the flavor material.

The present invention also provides a fried product obtained by reconstituting the above flavored imitation meat protein material with water or hot water in the case that the material is dried, optionally coating the reconstituted material with batter and/or another coating material and then frying the coated material.

DETAILED DESCRIPTION OF THE INVENTION

It has been found that a flavored imitation meat protein material having a good meat-like fibrous structure and mouthfeel, flavor and taste, which are hardly lost, even after chewing, can be produced by cooking an aqueous mixture of a protein raw material and a flavor material with a twin-screw extruder under high temperature and high pressure, and extruding through a die, while the cooked mixture being hot to expand the extruded material. Further, it has been also found that the use of egg white together with the flavor material is further effective for maintaining good flavor and taste after chewing due to fixation of the flavor material. Furthermore, it has been also found that, when the resulting imitation meat protein material is reconstituted with water or hot water in the case of the dried material, and optionally coated with batter and/or another coating material such as crumbs, and then frying, a fried product can be readily and conveniently produced and flavoring during reconstitution is not required.

The protein raw material used in the present invention is oil seed protein. Examples of oil seed protein include soy bean protein, rapeseed protein, peanut protein and the like. These proteins can be used alone or in combination thereof. Optionally, grain, grain proteins (e.g., gluten, glutenin, etc.) and animal proteins (casein, lactalbumin, etc.) can be used in combination with oil seed protein. If necessary, starch, polysaccharides, gums and the like can be used in combination with these proteins. The amounts and proportion of these ingredients can be appropriately chosen according to the production of a conventional imitation meat protein material.

Further, "okara", which is a soy bean curd residue mainly composed of dietary fibers and is often used as an ingredient of an imitation meat protein material, can be added. However, the amount of "okara" to be added should be at most 50% by weight, preferably, not more than 35% by weight based on the weight of the oil seed protein raw material. When the amount of okara exceeds 50% by weight, the desired fibrous structure is hardly formed because okara has less binding capacity and the extruded material is broken to pieces due to the expansion.

The protein raw material is subjected to so-called extrusion cooking, that is, treatment of a twin-screw extruder in the form of an aqueous mixture. The amount of water to be added can be varied according to a particular kind of the imitation meat protein material to be produced. However, usually, 15 to 70 parts by weight of water is added per 100 parts by weight of the solid material of the protein raw material.

The flavor material used in the present invention is not specifically limited and, for example, there can be used a known material selected from the group consisting of soy, "miso (bean paste)", salt, sugars, alcoholic fermentation products, protein hydrolysates, various extracts, amino acids, nucleic acids and synthetic flavors. These flavor materials can be used alone or in combination thereof. Particularly, in the case where the raw protein material is soy bean protein, it is preferred to use a soy bean fermented product such as soy, "miso" or the like, because this flavor material matches the raw protein material very well and hardly loses flavor even after chewing. As the soy bean fermented product, there can be used not only a product obtained by real fermentation, but also a product obtained by enzymatical decomposition (e.g., with a bio-reactor). However, the product obtained by real fermentation is preferred.

Although the amount of the flavor material can be appropriately chosen according to a particular kind of the imitation meat protein material to be produced, in general, it is used in an amount of 1.5 to 8 parts by weight calculated as the solid material per 100 parts by weight of the solid material of the raw protein material.

In the present invention, it is preferred to use egg white together with the flavor material. As egg white, it is preferred to use dried egg white or liquid egg white. However, there can be also used whole egg (dried or liquid) or other egg white-containing materials.

Egg white is effective for fixation of the flavor material so that flavor and taste are not lost even after chewing. Accordingly, it is used in an amount effective to fix the flavor material, but not in amounts as to be obstructive to the formation of the structure and texture of the imitation meat protein material. Usually, egg white is used in the weight ratio (as the solid materials) of egg white/ the flavor material of 0.2 to 5/1 in view of the fixation of the flavor material. Further, usually, egg white is used in an amount of at least 1 part by weight, preferably 1 to 10 parts by weight (as the solid material) per 100 parts by weight of the solid material of the raw protein material. When the amount of egg white is less than 1 part by weight, fixation of the flavor material is insufficient and, when the amount of egg white is more than 10 parts by weight, the texture and structure of the resulting imitation meat protein material is liable to become hard.

The flavor material and egg white can be admixed in an aqueous mixture of the raw protein material, or separately fed to a twin-screw extruder and admixed with the raw protein material in the extruder according to a conventional method.

Extrusion cooking in the present invention can be carried out according to a conventional extrusion technique using a twin-screw extruder. The twin-screw extruder to be used is not specifically limited and may be conventional one. A die for the extruder is not specifically limited, either and may be a conventional one.

For example, an aqueous mixture of the raw protein material, the flavor material and optionally the egg white is fed to a twin-screw extruder, processed under high temperature and high pressure such as a barrel temperature of 120° to 200° C. and a pressure of 5 to 100 kg/cm$^2$. The retention time is varied according to a particular extruder, but is usually 0.2 to 5 minutes. Then, the cooked mixture is extruded through a die having suitable orifice or openings, while the cooked mixture is hot to expand the extruded material. That is, in the process of the present invention, the die temperature is, usually, almost the same as the barrel temperature. By using a twin-screw extruder, scorching can be prevented and, even if the flavor material which is rich in sugars and amino acids is used, and a deterioration reaction, such as browning and the like, can be effectively prevented. Thereby, good flavor and taste are fixed and hardly lost even after chewing.

The imitation meat protein material thus produced is a shaped material, such as granules, pellets and the like, and can be used in the same manner as that of a conventional imitation meat protein material except that flavoring is not required. Preferably, in view of storage stability, the imitation meat protein material is dried according to a conventional technique, for example, with hot air at 60° to 120° C.

Particularly, the imitation meat protein material of the present invention is suitable for producing a fried product. In order to produce a fried product by using the dried imitation meat protein material, firstly, it is reconstituted with water. Although reconstitution depends upon water absorption of the material, usually, 3 to 8-fold, preferably 3.5 to 6-fold amounts of water is added to sufficiently reconstitute the material. The time required for reconstitution depends on the temperature of water and, for example, it takes about 20 minutes at 80° C., about 40 minutes at 50° C. and about 70 minutes at 30° C. However, when the temperature is higher than 90° C., the surface of the flavored imitation meat protein product is liable to become too soft, while the time required for reconstitution becomes shorter. Usually, in view of the mouthfeel of the resulting fried product, 80° C. or lower is preferred. After reconstitution, the material is drained.

The reconstituted material can be directly fried to obtain the desired fried product without coating. Alternatively, before frying, the imitation meat protein material can be coated with batter optionally containing egg or, batter and crumbs to obtain the desired cutlet type fried product.

Frying can be carried out according to a conventional method. For example, the material can be fried at 140° to 190° C. for 0.5 to 3 minutes. By frying, flavor and taste of the imitation meat protein material are further improved and mouthfeel thereof becomes mild.

Since no secondary flavoring of the imitation meat protein material is required in the present invention, the fried product can be readily and conveniently produced in a shop and served to consumers directly.

The following Examples further illustrate the present invention in detail but are not to be construed as limiting the scope thereof.

In the Examples, all the parts and percentages are by weight unless otherwise stated.

EXAMPLE 1

To a mixture of isolated soy beat protein (75 parts), wheat gluten (10 parts), starch (5 parts), soy (5 parts), an alcoholic fermentation product (2 parts), salt (1 part) and protein hydrolysate (1.5 parts) was added water in an amount 30% based on the total amount of the mixture. The resulting aqueous mixture was fed to a laboratory type twin-screw extruder (manufactured by Werner & Pfleiderer Co., C-58) and subjected to extrusion cooking under the following conditions and extruded through a die without cooling to obtain the desired flavored imitation meat protein material in the form of pellets of 20 to 30 mm in diameter.

barrel temperature: 150° C.
   barrel pressure: 10 kg/cm²
   retention time: 0.8 min.
   number of revolutions of screw: 250 r.p.m.
   die openings: round, 10 mm in diameter The pellets were dried with hot air at 110° C. for 0.1 hour to obtain the dried flavored imitation meat protein material.

Hot water (80° to 85° C., 6 parts) was added to the dried flavored imitation meat protein material thus obtained (1 part) and the mixture was allowed to stand for 30 minutes. The material was transferred to a basket to drain water to obtain the reconstituted material (about 4 parts). The material was coated with batter composed of a commercially available flour (1 part) and cold water (5° C., 1.2 parts) to obtained the coated material (about 5 to 5.2 parts). The coated material was fried with a vegetable oil at 170° to 180° C. for from 1 minute to 1 minute and 20 seconds to obtain the desired fried product (about 4 to 4.16 parts).

The fried product thus obtained had excellent meatlike mouthfeel as well as natural and palatable taste. The taste was hardly lost even after chewing.

EXAMPLE 2

The dried flavored imitation meat protein material obtained according to the same manner as described in Example 1 (1 part) was reconstituted with 0.5% aqueous salt solution (80° to 90° C., 7 to 8 parts) for 20 minutes. The material was transferred to a basket to drain water to obtain the reconstituted material (about 5.2 to 5.5 parts). The material was thinly coated with flower to obtain the coated material (about 5.4 to 5.7 parts). Then, it was coated with batter composed of flour (1 part) and cold water (2 parts) to obtain the batter coated material (about 5.95 to 6.25 parts) and further coated with crumbs to obtain the crumb coated material (6.65 to 6.95 parts). The material was fried at 175° to 185° C. for about 1 minute to obtain the desired cutlet type fried product (6.0 to 6.35 parts).

The fried product thus obtained had excellent meatlike mouthfeel as well as natural and palatable taste. The taste was hardly lost even after chewing.

EXAMPLE 3

According to the same manner as described in Example 1, each dried flavored imitation meat protein material as shown in Table 1 in the form of pellets of 10 to 20 mm in diameter was obtained.

TABLE 1

| Ingredients | Parts by weight Material Nos. | | | | |
|---|---|---|---|---|---|
| | 1 | 2 | 3 | 4 | 5 |
| Isolated soy bean protein | 61 | 61 | 61 | 61 | 61 |
| "Okara" | 20 | 20 | 20 | 20 | 20 |
| Wheat gluten | 10 | 10 | 10 | 10 | 10 |
| Starch | 6 | 6 | 6 | 6 | 6 |

TABLE 1-continued

| Ingredients | Parts by weight Material Nos. | | | | |
|---|---|---|---|---|---|
| | 1 | 2 | 3 | 4 | 5 |
| Soy | 6 | 6 | 6 | 6 | 6 |
| Salt | 1 | 1 | 1 | 1 | 1 |
| Protein hydrolysate | 1.5 | 1.5 | 1.5 | 1.5 | 1.5 |
| Dried egg white | 0 | 2 | 4 | 8 | 16 |

The dried flavored imitation meat protein material thus obtained was reconstituted with 6-fold hot water and roughly drained to obtain the reconstituted material containing about 3-fold water. Flavor and taste after chewing and mouthfeel of each reconstituted material were evaluated with 15 panelists. As the result, in comparison with the material No. 1 (control), all the materials Nos. 2 to 5 maintained their flavors and tastes even after chewing, and showed palatable tastes. However, the material No. 5 has a relatively hard mouthfeel. It was considered that this must result from its having too tight a texture or structure.

COMPARATIVE EXAMPLE 1

According to the same manner as described in Example 3, each dried flavored imitation meat protein material as shown in Table 2 was produced.

TABLE 2

| Ingredients | Parts by weight Material Nos. | |
|---|---|---|
| | 6 | 7 |
| Isolated soy bean protein | 31 | 30 |
| "Okara" | 50 | 50 |
| Wheat gluten | 10 | 10 |
| Starch | 6 | 6 |
| Soy | 6 | 6 |
| Salt | 1 | 1 |
| Dried egg white | 0 | 4 |

Upon extrusion from the die, the material was broken to pieces and no fibrous structure was formed.

EXAMPLE 4

A dried flavored imitation meat protein material obtained in the same manner as the material No. 3 in Example 3 (1 part) was reconstituted with hot water (80° to 85° C., 6 parts) for about 30 minutes. The material was transferred to a basket to drain water therefrom to obtain the reconstituted material (about 4 parts). The reconstituted material was coated with batter composed of commercially available flour (1 part) and cold water (5° C., 1.2 parts) to obtain the coated material (about 5 to 5.2 parts). The material was fried with a vegetable oil at 170° to 180° C. for 1 minute to 1 minute and 20 seconds to obtain the desired fried product (about 4 to 4.16 parts).

The fried product thus obtained had excellent meatlike mouthfeel as well as natural and palatable taste. The taste was hardly lost even after chewing.

EXAMPLE 5

A dried flavored imitation meat protein material obtain by the same manner as the material No. 4 in Example 4 (1 part) was reconstituted with hot water (80° to 85° C., 6 parts) for about 30 minutes. The material was transferred to a basket to drain water to obtain the reconstituted material (about 4 parts). This was fried at 140° C. for 3 minutes to obtain the desired fried product.

The fried product was used in a curried meat stew and showed excellent meat-like mouthfeel and palatable meat-like taste.

What is claimed is:

1. A process for producing a flavored imitation meat protein material having a fibrous structure which comprises the steps of:
    forming an aqueous mixture of a soybean protein raw material, okara, a soybean fermented product and egg white by adding 15 to 70 parts by weight of water per 100 parts by weight of the solid material of the protein material, said aqueous mixture containing the soybean fermented product in an amount of 1.5 to 8 parts by weight calculated as the solid material per 100 parts by weight of the solid material of the protein material, and the content of okara in the aqueous mixture being up to 35% by weight;
    cooking said aqueous mixture with a twin-screw extruder at 120° to 200° C. under 5 to 100 kg/cm$^2$ pressure; and
    extruding the mixture through a die, while it is hot, to expand the extruded material.

2. A process according to claim 1, wherein the soy bean fermented product is a member selected from the group consisting of soy, miso and mixtures thereof.

3. A process according to claim 1, wherein the weight ratio of egg white calculated as the solid material/ the flavor material calculated as the solid material is 0.2 to 5/1.

4. A fried product obtained by frying a flavored imitation meat protein material having a fibrous structure which is produced by
    forming an aqueous mixture of a soybean protein raw material, okara, a soybean fermented product and egg white by adding 15 to 70 parts by weight of water per 100 parts by weight of the solid material of the protein material, said aqueous mixture containing the soybean fermented product in an amount of 1.5 to 8 parts by weight calculated as the solid material per 100 parts by weight of the solid material of the protein material, and the content of okara in the aqueous mixture being up to 35% by weight;
    cooking said aqueous mixture with a twin-screw extruder at 120° to 200° C. under 5 to 100 kg/cm$^2$ pressure; and
    extruding the mixture through a die, while it is hot, to expand the extruded material.

5. A fried product according to claim 4, wherein the soy bean fermented product is a member selected from the group consisting of soy, miso and mixtures thereof.

6. A fried product according to claim 4, wherein the weight ratio of egg white calculated as the solid material/ the flavor material calculated as the solid material is 0.2 to 5/1.

7. A fried product according to claim 4, wherein the flavored imitation meat protein material is coated with batter or batter and crumbs before frying.

8. A process for producing a flavored imitation meat protein material having a fibrous structure which comprises the steps of:
    forming an aqueous mixture of a soybean protein raw material, okara, a soybean fermented product and egg white by adding 15 to 70 parts by weight of water per 100 parts by weight of the solid material of the protein material, said aqueous mixture containing the soybean fermented product in an amount of 1.5 to 8 parts by weight calculated as the solid material per 100 parts by weight of the solid material of the protein material, and the content of okara in the aqueous mixture being up to 35% by weight;
    cooking said aqueous mixture with a twin-screw extruder at 120° to 200° C. under 5 to 100 kg/cm$^2$ pressure;
    extruding the mixture through a die, while it is hot, to expand the extruded material; and
    drying the extruded material.

9. A process according to claim 8, wherein the soy bean fermented product is a member selected from the group consisting of soy, miso and mixtures thereof.

10. A process according to claim 8, wherein the weight ratio of egg white calculated as the solid material/ the flavor material calculated as the solid material is 0.2 to 5/1.

11. A fried product obtained by frying a flavored imitation meat protein material having a fibrous structure which is produced by
    forming an aqueous mixture of a soybean protein raw material, okara, a soybean fermented product and egg white by adding 15 to 70 parts by weight of water per 100 parts by weight of the solid material of the protein material, said aqueous mixture containing the soybean fermented product in an amount of 1.5 to 8 parts by weight calculated as the solid material per 100 parts by weight of the solid material of the protein material, and the content of okara in the aqueous mixture being up to 35% by weight;
    cooking said aqueous mixture with a twin-screw extruder at 120° to 200° C. under 5 to 100 kg/cm$^2$ pressure;
    extruding the mixture through a die, while it is hot, to expand the extruded material;
    drying the extruded material; and
    reconstituting said dried material.

12. A fried product according to claim 11, wherein the soybean fermented product is a member selected from the group consisting of soy, miso and mixtures thereof.

13. A fried product according to claim 11, wherein the weight ratio of egg white calculated as the solid material/ the flavor material calculated as the solid material is 0.2 to 5/1.

14. A fried product according to claim 11, wherein the dried flavored imitation meat protein material is reconstituted to 3 to 8-fold with water.

15. A fried product according to claim 11, wherein the flavored imitation meat protein material is coated with batter or batter and crumbs before frying.

* * * * *